Feb. 17, 1942. G. L. MATHER 2,273,533
APPARATUS FOR HOLDING RUBBER TIRE STOCK
DURING CUTTING OPERATIONS THEREON
Filed May 3, 1941 3 Sheets-Sheet 2
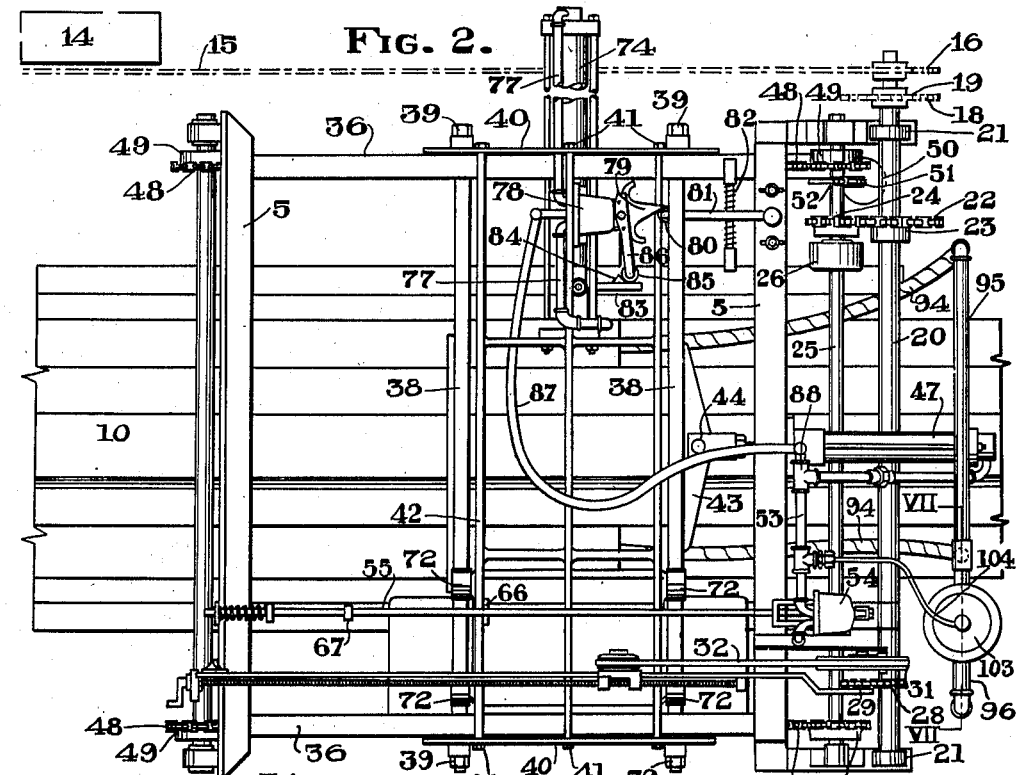
FIG. 2.
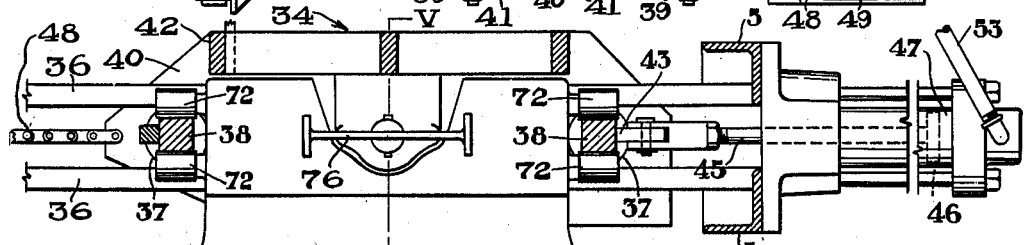
FIG. 3.
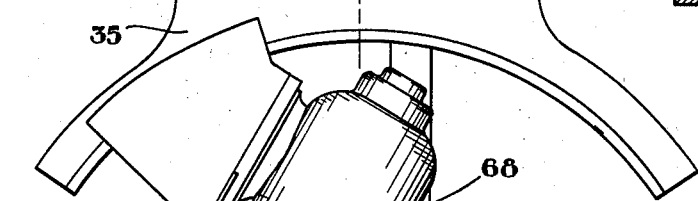
Inventor
GEORGE L. MATHER
Attorney Feb. 17, 1942. G. L. MATHER 2,273,533
APPARATUS FOR HOLDING RUBBER TIRE STOCK
DURING CUTTING OPERATIONS THEREON
Filed May 3, 1941 3 Sheets-Sheet 3
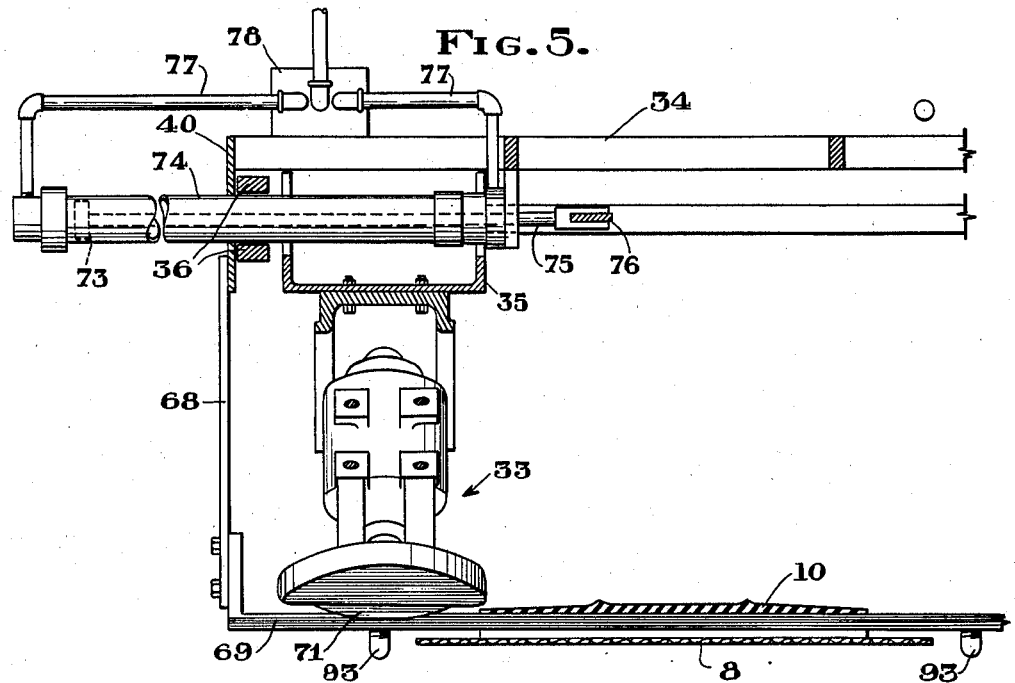
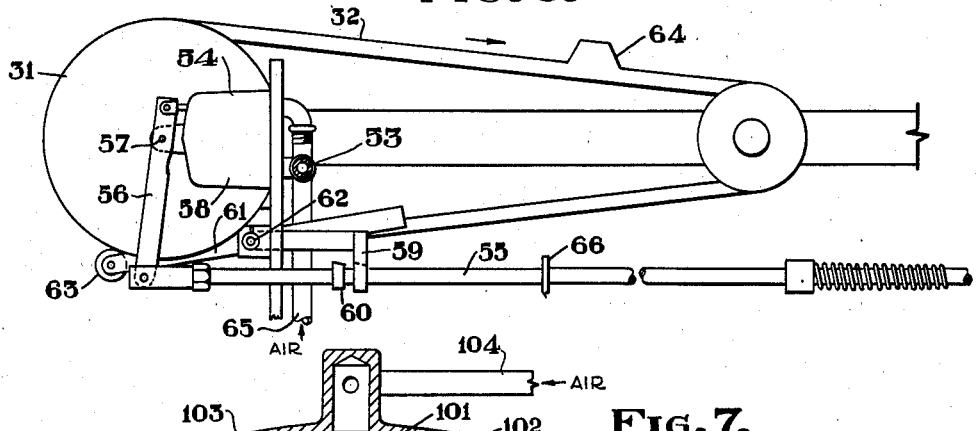
Inventor
GEORGE L. MATHER Patented Feb. 17, 1942

2,273,533

UNITED STATES PATENT OFFICE 2,273,533

APPARATUS FOR HOLDING RUBBER TIRE STOCK DURING CUTTING OPERATIONS THEREON

George L. Mather, Newark, Ohio, assignor to The Pharis Tire and Rubber Company, Newark, Ohio, a corporation of Ohio Application May 3, 1941, Serial No. 391,774

8 Claims. (Cl. 164—76)

This invention relates generally to apparatus used in the rubber industry in the operations of building vehicle tires. More specifically, it is directed to improvements in machinery for severing tread stock into lengths suitable for application to the peripheries of tire carcasses, the cutting operations being so performed that the ends of the sections will be beveled to facilitate the application thereof to the tire carcasses and produce a better connection or union between the ends.

One of the main objects of the present invention resides in the provision of a machine through which tread stock may be continuously passed while transverse severing operations are repeatedly performed thereon, means being provided in connection with the machine to firmly hold the stock during the cutting operations whereby smoother and cleaner cuts will result which will assist in the matching of the ends of the sections when they are applied to the tire carcass.

Another object resides in the formation of mechanism which may be positioned adjacent to a conveyor used to transport tread stock from an extruding machine to a point where another operation is performed thereon, the mechanism being provided with a circular rotary cutting blade and a backing or supporting bar, both of which move, first, with the conveyor and then counter thereto, the members cooperating to cut the tread stock transversely during their movement with the conveyor, the tread stock passing over the supporting bar during the movement of the latter counter to the movement of the conveyor.

A further object resides in forming the supporting bar with one or more chambers and a plurality of ports which extend from the upper surface of the bar to the chambers, negative pressures being established in the chambers and transmitted by way of the ports to the tread stock to firmly hold the same on the bar during the movement of the rotary knife from one edge of the tread stock to the other, means being provided to control the introduction of the vacuum so that it will only operate to hold the tread stock during the time the supporting bar is moving in the same direction as the conveyor and tread stock.

A still further object resides in providing a machine for severing tread stock during movement, said machine having cutting means which are caused to move in unison with the tread stock while the cutting operation is being performed, compressed fluid being utilized to effect the movement of the cutting means and to actuate the control means by which the negative pressures applied to tread stock holding means are governed, this arrangement insuring the proper timing of the latter means.

Additional objects will be apparent from the following description and the accompanying drawings in which the invention has been illustrated in one of its preferred forms.

In the drawings:

Fig. 2 is a plan view of the machine shown in Fig. 1;

Fig. 3 is a vertical longitudinal sectional view taken through the machine shown in Fig. 1;

Fig. 4 is a detail horizontal sectional view taken through the tread stock supporting bar on the plane indicated by the line IV—IV of Fig. 3, a portion of the bar being disclosed in elevation;

Fig. 5 is a vertical transverse sectional view taken through the cutting head of the machine on the plane indicated by the line IV—IV of Fig. 3;

Fig. 6 is a side elevational view of mechanism employed to actuate valve means for controlling the movement of the cutting head;

Fig. 7 is a vertical sectional view taken through the valve means employed to control the introduction of negative pressures to the tread stock holding means, the plane of this section being indicated by the line VII—VII of Fig. 1.

Figure 1:
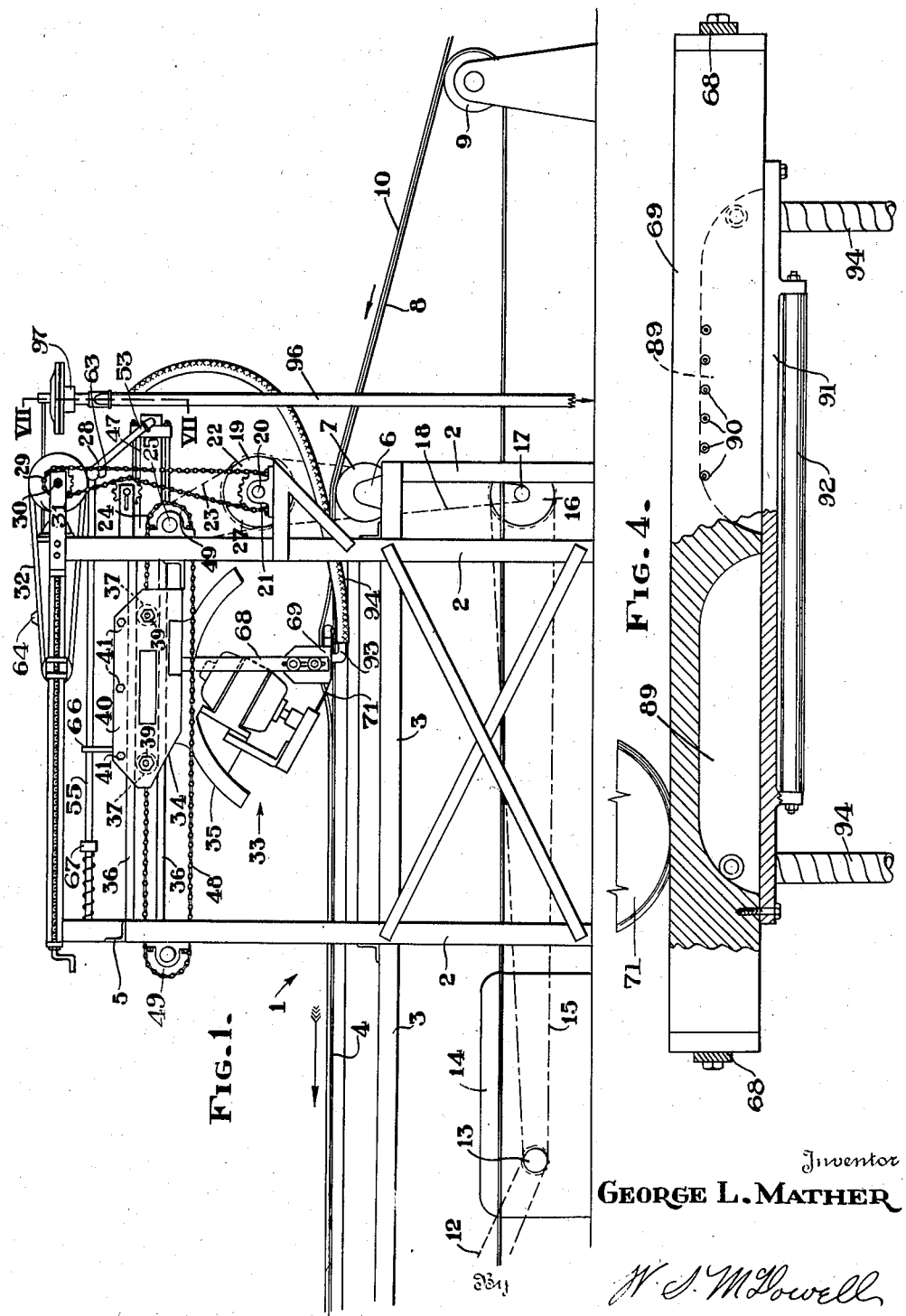
Fig. 1 is a side elevational view of a machine for severing tread stock formed in accordance with the present invention.

Referring more particularly to the drawings, the numeral 1 designates the tread stock severing machine in its entirety. In the present form, the machine includes a plurality of vertical legs 2 and horizontally extending bars 3, certain of the bars serving as supporting means for a conveyor shelf 4. Certain of the corner legs extend a considerable distance above the conveyor shelf and are connected by transversely extending angles 5 to form a rigid frame for the support of the cutting mechanism. At one end of the bars 3, there is provided bearing means 6 in which a cylinder 7 is journaled, this member serving to support an endless conveyor belt 8 at one end of the shelf 4. A similar cylinder 9 is journaled in spaced relation from the machine 1 to form a part of the conveyor system by means of which tread stock 10 is conducted from an extruding machine, not shown, to a point of use.

The cylinders 7 and 9 are idler members which are free to rotate in response to movement of the conveyor thereover, movement being imparted to the conveyor by a cylinder which is driven by an endless chain 12 which extends around a sprocket 13 provided in connection with transmission mechanism contained within a housing 14. This transmission mechanism may be driven in any suitable manner, depending upon the desires of the manufacturer.

A second chain 15 extends from the transmission to a sprocket 16 journaled for rotary movement at the forward lower end of the machine frame. This sprocket is connected with a small sprocket 17, the latter receiving a chain 18 by means of which movement is transmitted from the sprocket 16 to a large sprocket 19 which is secured to a shaft 20 journaled for rotary movement in bearings 21 carried at the end of the machine frame.

The shaft 20 has a second large sprocket 22 secured thereto which sprocket receives a chain 23 also trained around a small sprocket 24 journaled on a shaft 25. The sprocket 24 is connected with a one-way clutch 26 which permits the sprocket to rotate independently of the shaft 25. The purpose of this arrangement will be hereinafter set forth. The shaft 20 is provided with a third sprocket 27 for the reception of an endless chain 28 by means of which rotary movement is transmitted to a sprocket 29 journaled at the upper portion of the machine frame as at 30. The latter sprocket is connected with a pulley 31 around which an endless rubber belt 32 is trained, this member being employed to actuate valve means for controlling the operation of the cutting head disclosed generally by the numeral 33.

The cutting head 33 includes a carriage 34 and a motor driven knife support 35, the former being movable longitudinally of the frame in parallel relation to the conveyor and the latter being carried by the carriage and movable thereon at right angles to the movement of the conveyor. To support the carriage for longitudinal movement, the frame of the machine is provided at each side with a pair of spaced bars 36 for the reception of rollers 37 which are carried adjacent to the ends of square bars 38, these members being threaded at their ends for the reception of nuts 39 by means of which end plates 40 are secured to the bars. The upper portions of the plates 40 have openings through which screws 41 project to secure a skeleton frame 42 to the end plates. The frame 42, the plates 40 and the bars 38 cooperate to form the carriage which is movable through the provision of the rollers 37.

To effect the movement of the carriage, one of the bars 37 has a web 43 projecting therefrom and to which is pivoted, as at 44, one end of a piston rod 45. The opposite end of this rod carries a piston 46 arranged for longitudinal movement in an air cylinder 47. The cylinder is supported by a pair of angles 5 and is disposed with its longitudinal axis in parallel relation to the axis of the conveyor.

As illustrated in Fig. 1, the plates 40 have the ends of chains 48 connected therewith, these chains being trained around sprockets 49 journaled at the ends of the machine frame, the sprockets at the front end of the machine being secured to the shaft 25. By this arrangement, the shaft 25 will be revolved when movement is imparted to the carriage. Through the provision of the clutch 26, movement of the carriage by the introduction of compressed air to the cylinder 47 will be limited to a speed controlled by the rotation of the sprocket 24, since the clutch will only permit the shaft to rotate in the direction it is driven by the sprocket at the speed at which the sprocket rotates. After the carriage has reached the end of its forward movement, it is returned to the rearward position by rotating the shaft 25 in a reverse direction. This movement may be accomplished in any desired manner, the present machine having a weight 50 suspended from the lower end of a chain 51 secured at the opposite end to a sprocket 52 carried by the shaft 25. As the carriage moves in a forward direction, the chain 51 is wound on the sprocket 52 to elevate the weight. Then when forward movement is interrupted, the weight will gravitate and cause the shaft 25 to rotate in a direction whereby the chains 48 will return the carriage to the forward end of the machine.

Compressed air is introduced to the cylinder 47 through a pipe line 53 in which a valve 54 is positioned. This valve is operated by a spring pressed rod 55 connected at one end with a valve lever 56. This member is pivoted as at 57 to a valve housing 58. Normally, the valve is held in a closed position through the engagement of a lever 59 with a collar 60 carried by the rod 55. The lever 59 is actuated by another lever 61 which is pivoted as at 62 for rocking movement about the same axis as the lever 59. The free end of the lever 61 has a roller 63 journaled thereon, this roller being engaged with the outer surface of the belt 32 where it passes around the pulley 31.

The belt has an enlargement 64 provided thereon and when this enlargement moves between the roller 63 and the pulley 31, the lever 61 will be rocked about the axis 62 and this rocking movement will be transmitted to the lever 59 to elevate the free end thereof out of the path of movement of the collar 60. When so released, the rod 55 will move under the influence of its spring and cause the valve 54 to move to an open position. At this time, compressed air may flow through the pipe 65, the valve 54 to the pipe system 53 from which it will flow into the cylinder 47. This introduction of compressed air will move the carriage longitudinally in the same direction as the conveyor and tread stock are moved.

The forward portion of the carriage 42 is equipped with a plate 66 which is notched to receive the rod 55 and as the carriage moves forwardly, this plate will engage a second collar 67 provided on the rod 55 and move the rod in opposition to its spring. After the rod has moved a sufficient distance, the valve 54 will be closed and the collar 60 engaged with the free end of the lever 59 to hold the valve closed. When this valve is closed, the pipe system 53 will be open to the atmosphere to permit the compressed air to escape from the cylinder 47. Since there is then no pressure on the piston 46, the weight 50 will be free to gravitate to its lower position and move the carriage to the forward end of the machine.

Each end plate of the carriage has a strap 68 depending therefrom for the support of a transversely extending supporting bar 69. This member is turned up at its ends for adjustable connection with the straps 68 and the forward edge of the bar is beveled on its under side as at 70 to provide a relatively sharp edge along which the motor driven circular knife 71 is adapted to move in the tread stock severing operation. The knife is carried by the support 35 for movement longitudinally of the carriage and transversely with respect to the conveyor. To provide for this movement, the support 35 has a plurality of rollers 72 journaled at its sides, these members engaging the upper and lower surfaces of the square bars 38. Movement is imparted to the support 35 by a piston 73 which is mounted for longitudinal sliding movement in a cylinder 74 secured to the carriage and movable longitudinally of the conveyor in unison with the carriage. The rod 75 of the piston extends through the inner end of the cylinder and is connected with a yoke 76 projecting from one side of the support 35. The yoke is employed to permit the support to move the full length of the carriage and yet eliminate the necessity of extending the cylinder 74 to an extreme distance beyond the side of the machine. As illustrated in Fig. 5, the support may move under the inner end of the cylinder when the support is moved in one direction, the sides of the support being relieved to allow it to pass under the cylinder.

The piston 73 is moved by the introduction of compressed air to the cylinder through pipes 77 extending to the opposite ends thereof from a pair of valves 78 mounted on the upper portion of the carriage. These valves are alternately actuated upon the rearward or return movement of the carriage. Actuating extremities of the valves are connected to a pivoted wedge-shaped member 79 positioned adjacent to the valves and arranged for engagement with a roller 80 carried by a pivoted arm 81 supported by the angle 5 at the top of the forward portion of the machine frame. The arm is yieldably held in a central position by opposed springs 82 to engage the opposite sides of the member 79 when the carriage approaches the end of its return movement. By reason of this engagement, the roller will move over the inclined side surfaces of the member 79 and when it reaches the hook-shaped extremity of this surface, continued movement of the carriage will cause the actuation of the valves, one being opened and the other closed.

The member 79 is held in its positions of valve opening and closure by a spring-pressed bar 83 having a wedge-shaped projection 84 disposed for engagement with a roller 85 pivotally supported by a finger 86 projecting from the member 79. The compressed air is conducted to the valves 78 through a flexible conduit 87 communicating as at 88 with the pipe system 53. Thus, when the pipe system 53 receives the compressed air upon the actuation of valve 58, this compressed air will flow to the cylinders 47 and 74 and the carriage will move longitudinally of the conveyor and, at the same time, the knife support will move transversely thereof. As this movement takes place, the knife 71 will pass through the tread stock which extends over the bar 69 and sever a section therefrom. Since the axis of rotation of the blade 71 is disposed at an angle relative to the vertical, the tread stock will be severed on an angular plane which will produce a skived or beveled end on the tread stock. This type of cut is desirable in the trade because it facilitates the connection of the ends of a section of the tread stock during the application thereof to a tire carcass.

To positively retain the stock during this cutting operation, the bar 69 has a plurality of chambers 89 formed therein and a plurality of passages 90 communicate with the chamber and extend to the upper surface of the bar. These passages are enlarged at their upper ends to provide increased surface for engagement with the tread stock. The rear ends of the chambers are closed by a block 91 secured to the rear edge of the bar 69 and the block has a pair of rearwardly projecting ears between which is journaled a roller 92. This roller engages the tread stock and eliminates friction between the stock and the bar when the latter moves in opposition to the direction of travel of the conveyor. A pair of pipe elbows 93 establish communication between the chambers 89 and a pair of hose 94 extending from a vacuum manifold 95, the latter member being supported at the front of the apparatus and communicating with a pipe 96 which extends to a vacuum creating pump, not shown.

Between the manifold and the pipe 96, there is positioned a valve 97 shown in detail in Fig. 7. This valve has a plunger 98 arranged to close the port 99 under the influence of a compression spring 100. The plunger is extended through the casing of the valve and is connected at its upper end as at 101 to a diaphragm 102. The upper surface of the diaphragm is covered by a housing 103 and the space between the housing and the diaphragm is connected by a tube 104 with the pipe system 53. It will be seen that when compressed air is introduced to the pipe system, the pressure will be transmitted by the tube 104 to the chamber above the diaphragm and this pressure acting on the upper surface of the diaphragm will force the plunger in opposition to the spring to move the plunger away from the seat 99 and establish communication between the manifold 95 and the pipe 96.

The establishment of negative pressures in the manifold causes the exhaustion of air from the chambers 89 and when this condition exists in these chambers, the reduced pressures will be transmitted by the passages 90 to the under surface of the tread stock and result in causing this material to be firmly held in engagement with the bar.

By actuating the valve 97 with the fluid introduced to the pipe system 53, the tread stock holding means will become effective only when pressures are introduced to the cylinders 47 and 74 to move the cutting apparatus. As soon as the carriage and the knife have completed their movement in the same direction as the tread stock, the pressure in the pipe system will be reduced and the spring in the valve 97 will cause the plunger to move to a closed position, interrupting the communication of the pipe 95 with the pipe 96. When the valve is closed, the subatmospheric pressures in the chambers 89 will be raised to a normal pressure and the tread stock will be released from the bar. When the fluid under pressure stops flowing to the cylinders 47 and 74, and these cylinders are vented, the weight 50 will cause the carriage to return to a starting position. The support 35 moves relative to the carriage only when the latter member is moving in the same direction as the conveyor. Suitable switch means are provided on the support to reverse the direction of rotation of the cutting knife each time it moves transversely of the tread stock.

As illustrated in Fig. 4, the cutting bar is formed with a plurality of internal chambers 89 to prevent the vacuum from being broken in the event narrower strips of tread stock are fed through the apparatus. In some instances, these narrower strips may not cover all of the passages 90 and by providing a plurality of chambers, a better vacuum is produced when this condition occurs.

While the invention has been disclosed in considerable detail, it is obvious that many minor changes may be made in the construction and relation of parts without departing from the spirit and scope of the invention as set forth in the following claims.

What is claimed is:

1. In mechanism for severing tread stock, continuously operated conveyor means for moving the tread stock, a supporting bar extending transversely of said conveyor and movable in unison therewith, the tread stock extending over said bar, a rotary knife disposed adjacent to said bar, said knife being movable both longitudinally and transversely relative to said conveyor, and vacuum operated means for holding said tread stock in firm engagement with said bar during movement of said knife.

2. In mechanism for severing tread stock, a continuously moving conveyor belt for transporting the tread stock, cutting means alternately movable in unison with and in opposition to said conveyor belt, said means having a supporting bar extending transversely of said belt and over which the tread stock is trained, a rotary knife movable longitudinally of said bar to sever said stock during movement of said bar in unison with said conveyor, and vacuum means for holding said stock in firm engagement with said bar during the movement of said knife, said means comprising a chamber in said bar, a plurality of passages extending from said chamber to the surface of said bar engaged by said stock, and means for establishing negative pressures in said chamber.

3. In mechanism for cutting tread stock into sections of desired length during movement, a conveyor belt for moving said stock, cutting means alternately movable in unison with and in opposition to said belt, said cutting means having a supporting bar extending transversely of said belt and over which said stock is trained, a rotary knife disposed adjacent to said bar and supported for movement longitudinally thereof, primary means for simultaneously moving said bar in unison with said conveyor and said knife longitudinally of said bar, secondary means for moving said bar in opposition to said conveyor while said knife remains fixed with respect to the bar, and means controlled by the primary moving means for holding the tread stock in firm engagement with said bar during movement of the latter in unison with said conveyor.

4. In mechanism for cutting tread stock into sections of desired length during movement, a conveyor belt for moving said stock, cutting means alternately movable in unison with and in opposition to said belt, said cutting means having a supporting bar extending transversely of said belt and over which said stock is trained, a rotary knife disposed adjacent to said bar and supported for movement longitudinally thereof, primary means for simultaneously moving said bar in unison with said conveyor and said knife longitudinally of said bar, secondary means for moving said bar in opposition to said conveyor while said knife remains fixed with respect to the bar, a chamber provided in said bar, a plurality of reduced passages extending from said chamber to a surface of the bar engaged by the tread stock, and means for establishing subatmospheric pressures in the chamber in said bar, the introduction of the subatmospheric pressures being controlled by said primary bar moving means.

5. In mechanism for cutting tread stock into sections of desired length during movement, a conveyor belt for moving said stock, cutting means alternately movable in unison with and in opposition to said belt, said cutting means having a supporting bar extending transversely of said belt and over which said stock is trained, a rotary knife disposed adjacent to said bar and supported for movement longitudinally thereof, means operated by fluid under pressure to simultaneously move said bar in unison with said conveyor and said knife longitudinally of said bar, additional means for moving said bar in opposition to said conveyor while said knife remains fixed with respect to the bar, a plurality of chambers provided in said bar, a plurality of passages extending from said chambers to a surface of said bar engaged by said tread stock, fluid conducting lines connecting said chambers with means for producing subatmospheric pressure, and valve means for controlling the flow of fluid through said fluid conducting lines, said valve means being operated by the introduction of fluid under pressure to said bar moving means.

6. In apparatus for cutting tread stock into sections of desired length during movement, cutting means alternately movable in the same direction with and in the opposite direction from the tread stock, said cutting means having a hollow bar for supporting the tread stock and a knife movable longitudinally thereof, a plurality of passages extending from the hollow interior of said bar to the surface engaged by the tread stock, means for establishing subatmospheric pressures in the interior of the bar, and means for controlling the reduced pressure introducing means whereby such pressures will be created within the hollow bar only during movement thereof in the same direction as the tread stock.

7. In mechanism for severing tread stock, a continuously moving conveyor belt for transporting the tread stock, cutting means alternately movable in unison with and in opposition to said conveyor belt, said means having a supporting bar extending transversely of said belt and over which the tread stock is trained, a rotary knife movable longitudinally of said bar to sever said stock during movement of said bar in unison with said conveyor, vacuum means for holding said stock in firm engagement with said bar during the movement of said knife, said means comprising a chamber in said bar, a plurality of passages extending from said chamber to the surface of said bar engaged by said stock, vacuum producing means communicating with the chamber in said bar, valve means for interrupting the communication between said vacuum producing means and said chamber, and means for maintaining said valve in communication-establishing position when said cutting means moves in unison with said conveyor.

8. In apparatus for cutting sheet material during movement thereof, conveyor means for supporting and moving the material to be cut, cutting means, means for simultaneously moving said cutting means in the same direction as and in unison with said conveying means and in another direction relative thereto to sever material thereon, means for moving said cutting means in a direction opposed to that of said conveying means to return the same to a starting position, vacuum operated means for holding the sheet material to prevent movement thereof relative to said conveying means while the cutting means is severing the material, and means for rendering said holding means inoperative during movement of said cutting means in the direction opposed to that of said conveying means.

GEORGE L. MATHER.